US005196841A

United States Patent [19]

Harder et al.

[11] Patent Number: 5,196,841

[45] Date of Patent: Mar. 23, 1993

[54] VAULT DOOR LOCKING SYSTEM FEATURING MICROPROCESSOR-BASED LOCKING MEANS WITH REDUNDANCY CONTROL OVERRIDE

[75] Inventors: Josef Harder, Regensberg; Peter Kappeler, Regensdorf, both of Switzerland

[73] Assignee: Bauer AG, Rumlang, Switzerland

[21] Appl. No.: 531,913

[22] Filed: May 29, 1990

Related U.S. Application Data

[63] Continuation-in-part of Ser. No. 100,161, Sep. 23, 1987, abandoned, which is a continuation-in-part of Ser. No. 556,333, Nov. 30, 1983, abandoned.

[30] Foreign Application Priority Data

Dec. 3, 1982 [CH] Switzerland ........................ 7056/82

[51] Int. Cl.[5] ........................ G06F 7/00; E05B 47/00; E05B 49/00

[52] U.S. Cl. ............................ 340/825.31; 340/825.3; 70/277; 70/278

[58] Field of Search ............... 70/277, 278; 340/825.3, 340/825.31, 825.69, 825.72; 361/172

[56] References Cited

U.S. PATENT DOCUMENTS

| | | | |
|---|---|---|---|
| 3,878,511 | 4/1975 | Wagner | 340/825.31 |
| 3,881,171 | 4/1975 | Moorman et al. | 340/825.31 |
| 4,079,605 | 3/1978 | Bartels | 356/71 |
| 4,083,424 | 4/1978 | Von Den Stemmen et al. | 361/71 |
| 4,665,727 | 5/1987 | Uyeda | 70/277 |
| 4,671,086 | 6/1987 | Fogleman et al. | 70/277 |

FOREIGN PATENT DOCUMENTS

| | | | |
|---|---|---|---|
| 0111186 | 6/1984 | European Pat. Off. | 70/278 |
| 2082669 | 3/1982 | United Kingdom | 70/277 |
| 2119548 | 11/1983 | United Kingdom | 70/277 |

*Primary Examiner*—Donald J. Yusko
*Assistant Examiner*—Peter Weissman
*Attorney, Agent, or Firm*—EGLI International

[57] ABSTRACT

A locking system for a security door comprises a lock mounted on an inner surface of a door and an operating system located outside of the door. The lock has a bolt movable between locking and unlocking positions and a releasable blocking mechanism controlling and preventing movement of the bolt to its unlocking position. A mechanism for actuating the blocking mechanism is operatively coupled to the operating system. The operating system is independent of and spaced from the lock position to mask the blocking mechanism position.

11 Claims, 3 Drawing Sheets

VAULT DOOR LOCKING SYSTEM FEATURING MICROPROCESSOR-BASED LOCKING MEANS WITH REDUNDANCY CONTROL OVERRIDE

CROSS REFERENCE TO RELATED APPLICATIONS

The present invention is a continuation-in-part of application Ser. No. 100,161 filed Sep. 23, 1987, now abandoned, which is a continuation-in-part of application Ser. No. 556,333 filed Nov. 30, 1983, now abandoned.

FIELD OF THE INVENTION

The present invention relates to a locking system for movable high security or vault doors. More particularly, the present invention relates to a locking system for armored doors, with locks having a movable bolt and locking rods acting on the bolt to prevent movement of the bolt, in which the locking rods are remotely controlled.

BACKGROUND OF THE INVENTION

Movable high security or vault doors are devices which periodically open and periodically close and lock openings.

Conventional locking systems have certain weaknesses which fail to satisfy the usual modern safety and security requirements for door locks. Known attempts to avoid weaknesses in conventional systems involve the security aspects. The steps taken are many and varied, and mainly relate to the armoring.

In spite of such protective measures, the position of the locking points must remain secret. If it is known, a persistently performed destruction of the protective means would result in unauthorized opening of the door. The position of the locking points, which normally should be unknown, can be found out so that the position of the lock is known. Within certain limits the position of the lock is determined by the lock-opening device on the outside of the armored door. This narrowing down of the possible area where the locking points may be situated, together with knowledge of the type of lock (individual types of lock are extremely widespread) may permit opening of the safety door, even without a key or code. Moreover, the number of locks, and therefore, the number of locking points is very limited, since every lock requires a connecting element which extends outside directly through a hole in the armor, and an operating element on the outside which indicates the position of the lock and locking point.

Another serious weakness is inherent in the lock mechanism itself. The combination locks used in safety closures can be unlocked by a code, defined inside the lock by the relative positioning of a predetermined combination of a number of coding discs. The "inner" unbolting enables the lock mechanism to be actuated. The "outer" unbolting, for example, between the door and the frame enables the safety closure to open.

In a correctly locked safety security door (for example, an armored door), the combination lock is actuated by decoding the coding discs. At any angular position of the discs in relation to one another, a deliberate ordering of the positions of all of the unbolting places on the coding discs in accordance with the combination permits the lock mechanism to be actuated by "inner" unbolting for opening purposes. The ordering of the coding discs for opening remains set. After the door has been relocked this setting is not automatically canceled. The cancellation of the ordering must be performed very deliberately and is known as code scrambling. The scrambling of the code must not be forgotten, although unfortunately this often happens in practice such that the ordered coding discs permit a door firmly locked by the bolts to be reopened.

The proper scrambling of the opening code involves varying the condition of each of the coding discs (usually three to four discs can be used). Casual scrambling may turn the release groove of a single disc through only ten degrees of angle permitting a properly locked and bolted door to be unbolted again and opened by a skillful exploitation of this circumstance, i.e., by a slight turn of the combination knob.

Persons entitled to perform opening and closing of the door generally do not understand the function of the lock, and must adhere strictly to the operating instructions to avoid errors. One step which is of concern is the periodic changing of the opening code. In spite of thorough training, errors are repeatedly made in this procedure. The most unpleasant one is that a new code thought to have been inputted, no longer unbolts the lock such that the door can no longer be opened. The fear that this may occur results in the original code, set at the factory, being retained for years on end, even through personnel fluctuate and the code may have become known to unauthorized persons.

In practice, a locking system has a hard safety aspect and a soft safety aspect which must be given equal importance. It is unimportant whether a burglary is the result of errors amounting to negligence, or harder measures including safe cracking.

SUMMARY OF THE INVENTION

An objective of the present invention is to provide a locking system for movable high security or vault doors which obviates the disadvantages of conventional systems particularly these described above, and provides the highest possible degree of security.

A further object of the present invention is to provide a locking system for movable high security or vault doors which affords a high degree of security against dangerous errors by persons permitted to handle the locking system, and readily neutralizes the errors which occur.

Another object of the present invention is a locking system which improves security equally against unauthorized opening by "hard" or "soft" methods and against behavior which endangers security.

The foregoing objectives are basically obtained by a locking system for movable high security or vault doors requiring high security. The system comprises at least one lock having at least one bolt movable between locking and unlocking positions. The lock is mounted on an inner surface of the door and has releasable blocking means for controlling and preventing movement of the bolt to its unlocking position. Means are provided for actuating the blocking means. An operating system is located outside of the door and is independent and spaced from the position of the lock to mask the position of the blocking means and the lock. The operating system which is adapted for receiving opening and closing codes and controlling the lock in response thereto includes a first portion located outside said door and a plurality of corresponding second portions located inside said door, said first portion of said operating means being spaced from said lock and interconnected to each of said plurality of corresponding second portions of said operating means, each of said plurality of corresponding second portions of said operating means being connected in parallel for supplying electrical inputs to said lock, and capable of modifying code signal permutations supplied thereto by said first portion, each of said plurality of corresponding second portions mutually controlling, analyzing and vindicating operations of the remaining second portions to determine malfunctions, said first portion being capable of changing opening and closing codes to said lock without access to the inside of the door. Coupling means operatively connects the operating system to the actuating means and to other locks.

Thus, the present invention allows more than one code to be used at one time and is readily programmable. Variable frequencies can also be used along with redundancy in the security area. Furthermore, multiple closing points can also be triggered independently from an input area and the locking bolt can be controlled by a locking mechanism.

The foregoing objectives are also basically obtained by a method of operating a locking system for a security door including a security door, a lock with a movable bolt and releasable blocking means for preventing movement of the bolt to an unlocked position, actuating means for operating the blocking means and an operating system placed outside and removed from the security door and being operatively coupled to the actuating means for operating the blocking means.

The method comprises the steps of generating a first set of electric signals for actuating the blocking means, generating a second set of electric signals corresponding to positions of the security door and the bolt, and analyzing the first and second sets of electric signals to control operating of the actuating means based on the first and second sets of electric signals.

Other objectives, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE PREFERRED EMBODIMENT

Figure 1:
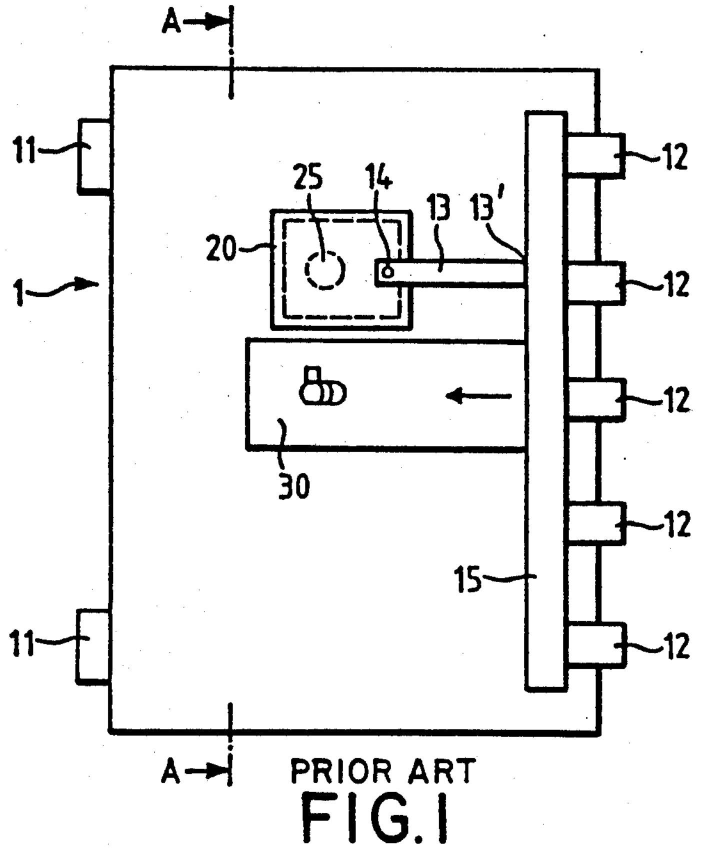
PRIOR ART FIG. 1
FIGS. 1 and 1*a* are a front view and a side sectional view diagrammatically illustrating an armored door according to the prior art.

FIG. 1 is a front elevational view of a conventional armored door 1 without the required frame. On one side of the door, two door hinges of conventional construction are shown, by way of example, as two rectangles 11. A number of bolts 12 disposed on a bolt beam 15 are shown in a simplified manner on the other side of the door. The bolts 12 can make traversing movements, and can be inserted in corresponding depressions in the frame and pulled out again.

The bolt beam 15 can be moved together with the bolts 12. The movement is transmitted to the bolt beam 15 by a bolt drive 30. For simplicity, the conventional lock mechanism is shown merely by a chain-line square with a circle in it. The circle indicates an operating system 25, for example, a numerical combination knob, or a keyhole with the associated key.

A locking bar 13 is connected on one side at a place 13' to the bolt beam 15, and is articulated on the other side to a locking point 14. The locking point 14 blocks or releases the locking bar 13, and is advantageously protected behind armoring 22.

This description, involving only the essential points, corresponds to the present known prior art.

Figure 2:
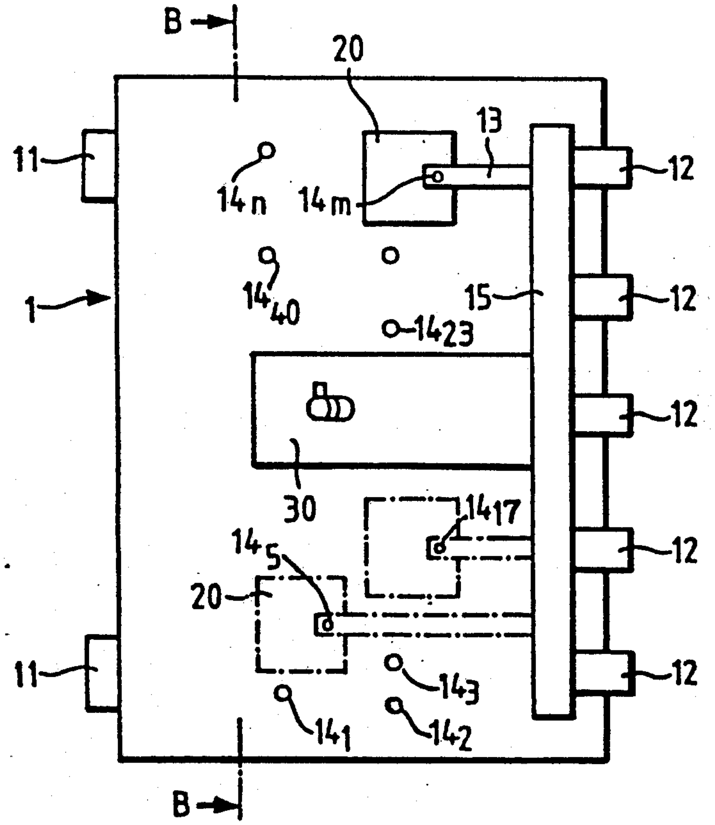
FIGS. 2 and 2*a* are a front view and a side sectional view diagrammatically illustrating an armored door according to the present invention.
Figure 2A:
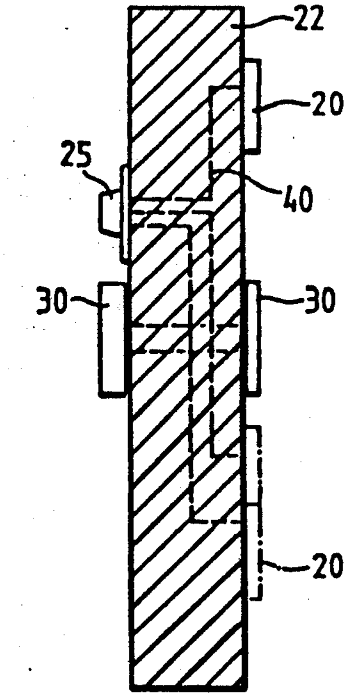

FIGS. 2 and 2*a* show, in highly simplified form, an armored door 1 of the present invention. The door comprises a bolt beam 15 bearing the bolts 12, two hinges 11 and a lock 20 whose mechanism is connected via a locking bar 13 to the bolt bar 15.

According to the invention, locking point coordinate $14_l \ldots 14_m \ldots 14_n$ are distributed over large parts of the door zone and extend in any order or disorder over the door zone. By a freely available selection procedure, a locking point co-ordinate is now selected. In the illustrated case, the locking point co-ordinate is $14_m$ in the zone of the lock 20.

The functioning of this step assumes that no direct lead-ins from the outside of the door are needed for lock actuation. The lock 20 is, therefore, remote-controlled by electric means. In accordance with the required safety, lead-ins for power supply cables from the outside to the inside of the door can extend through the door hinges.

The locks 20, shown in FIG. 2*a* are disposed at various places $14_l \ldots 14_m \ldots 14_n$. The electric supply lines 40 extend from the locks 20 to an operating system 25. The operating system 25 itself can be provided at a single location or multiple locations. Thus, the place $14_m$ and additional further places such as $14_n$ can be provided simultaneously with locks and two locking bars 13 acting simultaneously on the bolt beam. In this way either two or only one operating system might unbolt two locks alternatively to release the bolt beam for opening the door. The possible uses are thereby substantially extended and will be disclosed hereinafter in connection with FIG. 3.

Figure 1A:
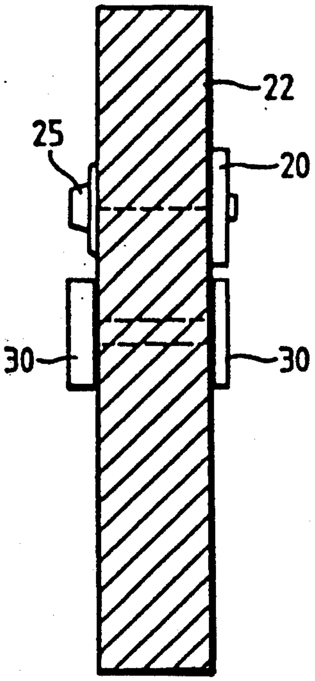
PRIOR ART FIG. 1a

FIGS. 2 and 2*a* show a decentralized loading system as compared to the centralized system of FIGS. 1 and 1*a*. The decentralized system provides a much higher degree of security since locking units can be placed at numerous locations, as for example, 50 locations on the inside of the door and consequently are practically impossible to locate and destroy or operate by non-authorized persons. For example positions, $14_5$, $14_{17}$, $14_{23}$ and $14_{40}$ can be selected as lock positions for a four lock design. The decentralized system offers an almost unlimited number of lock positions on the inside of the door so that hardly two doors have the same lock arrangement. Doors with centralized locking systems are of identical design and it is sufficient to destroy the bolt drive in order to open the door. These known systems have non-intelligent locks with an electromagnetic sliding bolt which can be operated on the basis of a Y/N command. In contrast, in the present invention, there are intelligent locking units which each comprise a locking device and a lock. Such units can be operated by means of a lock only. Note should be taken that the lock position or positions cannot be identified from the: outside of the door.

Figure 3:
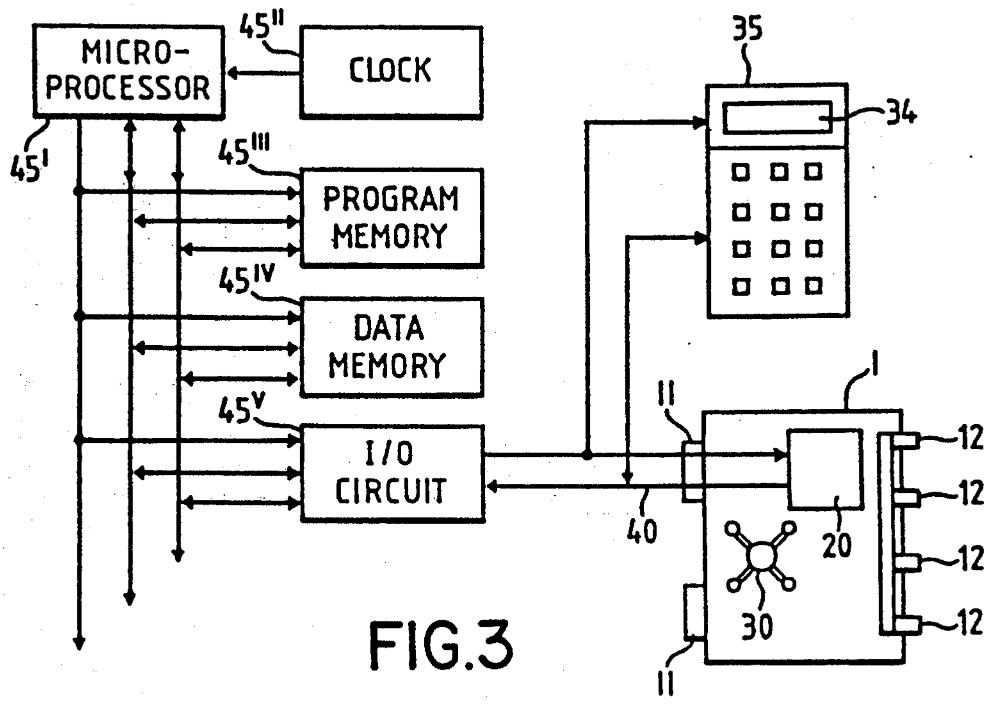
FIG. 3 is a block diagram of an electric remote control for the lock of the door shown in FIG. 2.

FIG. 3 shows diagrammatically the elements which can be used for "inner" bolting and unbolting with the electric remote control of the mechanical system. Since the code is not inputted mechanically by turning a combination knob, but is inputted on a device mechanically uncoupled to the lock, storing the code mechanically in the lock mechanism itself is obviated. A microprocessor can be used advantageously if its electronic storage is available to deposit the opening code. Thus, the left-hand side of FIG. 3 is a conventional diagrammatic representation of a microprocessor 45' with a typical wiring as well as a clock 45" program memory 45''', data memory $45^{iv}$ and input-output circuit $45^{v}$. A program can be stored or an operating program can be a hardware form of a simple logic network. The data storage can be used, for receiving the opening and closing codes, and other data for enhanced security.

Lastly, an input/output circuit connects the processor to the peripherals including one or more mechanical closures. In this example, the armored door of FIG. 2 is shown again. Electrical supply lines extend through a door hinge 11 to the inside of the lock where a mechanism is actuated by a motor for "inner" unbolting. If the lock 20 is open, the "outer" bolting between the bolts 12 and the door frame can be unbolted by a bolt drive 30. As a result the door also is opened.

An inputting keyboard 35 can be used for the inputting of the opening code. Status information, store contents, etc. can be displayed conventionally on a display 34. An operating system 25 is shown, as in FIG. 1. In FIG. 1 the operating system is a numerical combination knob or a keyhole with associated key. In FIG. 2 the operating system is a keyboard 35, disposed, if possible, outside the door zone. The electric circuit parts 45', 45". . . required for lock actuation are disposed on the protected side of the door. In FIG. 3, the total operating system 45 comprises a processor with storage, peripheral interface and a keyboard 35. One or more keyboards can be placed on the door, in its immediate vicinity and/or remote therefrom. In this way, a hierarchy of admission steps can be established, for example, as set forth hereinafter.

When the cashier wants to open the security door, the cashier composes the code known to him on a keyboard near the door. The lock is unbolted only when the Director, advised for this purpose, composes on a keyboard in his office the code known only to the Director. Only the cooperation of the two codes unbolts the lock so that the cashier can open the door completely by the bolt drive 30.

As a result, it would be completely impossible to force entrance by threatening the cashier and making him reveal the code he knows. The cashier may put pressure on the Director who is not visible, and the Director can reveal the Director's code to protect the safety of the cashier. However, the Director at the same time can actuate the closure and alarm devices to warn the police.

Figure 4:
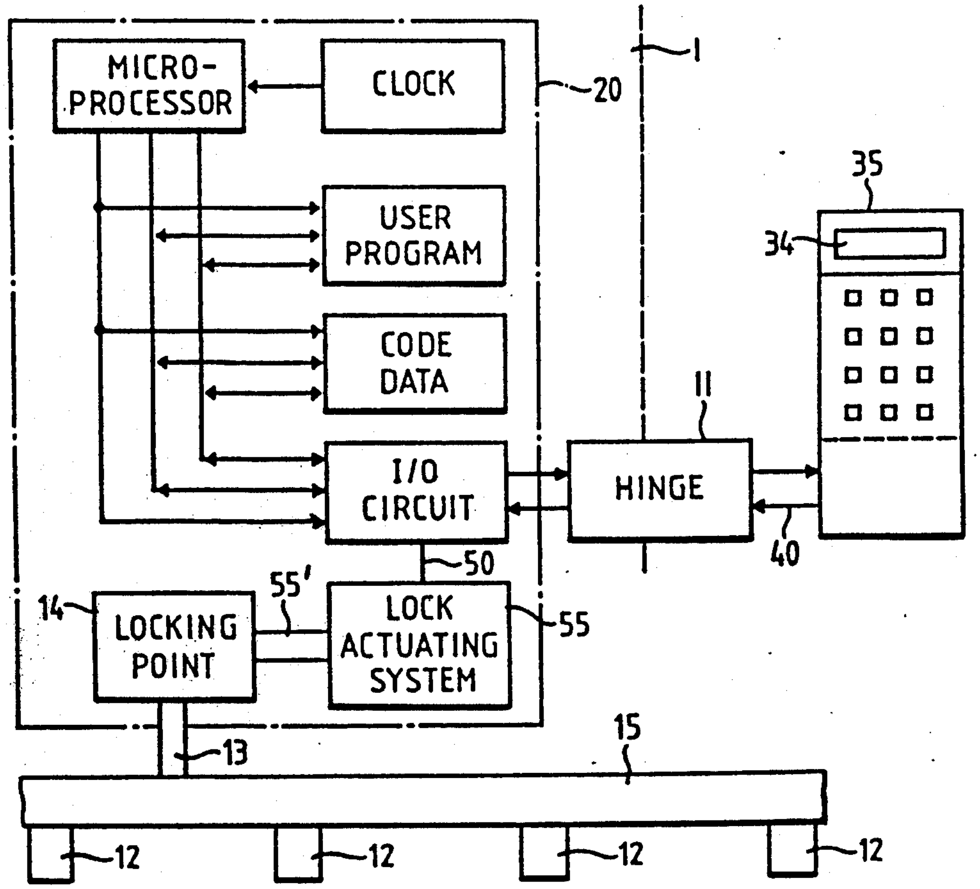
FIG. 4 is a block diagram of the electric control system illustrated in FIG. 3 in connection with the details of the armored door.

FIG. 4 shows an embodiment in accordance with the general wiring illustrated in FIG. 3, in which the microprocessor with storage for the user program, storage for the key data and an I/O network is disposed inside from the door zone 1, i.e., inside the security zone. From the input/output circuit, supply lines extend through the hinge 11 to a keyboard 25 which is disposed outside the door zone and which is connected via the supply lines 40 to the electronic system in the door zone. From the I/O network, an electric supply line 50 extends to the lock-actuating system 55, which converts electrical values into a mechanical drive. The lock-actuated system can be a motor to produce rotation, or a magnet to produce traversing movement. This conversion of an electric value into a mechanical value via the lock-actuating system is represented by an electric supply line 50 extending to the lock-actuating system 55 and a mechanical connection 55' to the lock. The reference 55' represents the mechanical connection to the lock through which the lock can be opened to actuate the locking bar 13 releasing it from the locking point 14 with the bolt beam 15. The bolt beam 15 has bolts 12 which engage the door frame. The operating methods for actuating the door are deposited in the user program storage. The key data storage receives all the user-specific security data which are required for the electronic management of the security closures. Such data are then analyzed through the keyboard 35 disposed outside the door zone.

In the operating procedure, the electric operating values for lock actuation are produced. The operating procedure is so designed that only dynamic processes satisfying predetermined specifications produce any effect. Static conditions have no effect on lock actuation. Lock actuation can be performed, for example, by a.c. motors which are controlled by such operating values. The control system can be designed for frequency-dependent operation using the motor torque band.

A homopolar voltage level lasting for a long time cannot be used to activate lock actuation, as with a d.c. motor. With frequency-dependent operation, the door can be opened only by dynamic electric values which correspond to the predetermined parameters. Any other condition keeps the mechanical closure locked securely.

The most important steps in the operating method sequences are as follows:

1. Preparation of an operating frequency.
2. Reception of status information concerning the lock position.
3. Decision by the program whether opening is to be performed.
4. Status information, for example, inside a time window as to whether the lock is OPEN or CLOSED respectively; if this condition is not met, a fault is announced.
5. Return of the lock and electronic system to an initial condition.

The positions of the bolts and the positions of the door are determined for monitoring the armored door. This information can be determined, for example, via microswitch positions. The position of the door leaf is preferably detected by the means set forth in Swiss patent specification No. 629,565 corresponding to U.S. Pat. No. 4,394,584. The following logic table indicates the essential conditions of the locking system:

| α \ R | 0 | 1 |
|---|---|---|
| 0 | d | c |
| 1 | b | a |

wherein:

R=bolt position (for example, door bolt 12);

α=door position (for example, door position angle);

o=bolt open o=door open (for example α large)

(a) In condition "a", the door open is closed and the bolts are advanced. This condition corresponds electronically to a neutral condition or a fixed function. If this condition is reached, the locking operation is concluded.

(b) If the door is already closed (i.e., the door is pivoted into its closed position and the door position sensor indicates a closed door), but the bolt is still open (i.e., not yet advanced), such door can be readily reopened. This condition of the properly closed, but unlocked, armored door is often overlooked. The security closure is sometimes left in this condition. In the method according to the invention, the microprocessor provides a display inside a time window to indicate the abnormal condition.

(c) Preferably, the condition where the bolts are advanced with the door opened is to be avoided. This can readily be accomplished with a suitable user program. In a manner similar to condition "b", any abnormal condition is displayed by the microprocessor inside a time window. However, circuitry can be advantageously provided to prevent this condition from occurring at all.

(d) As in condition "a", the condition "d" is an objective to be attained. The bolt and the door are open to permit entry into a security area. The time function prevents the security system from being opened, even by authorized personnel, outside given times, which may be changed. The condition "d" (i.e. bolt and door pivoted outwards) is the condition in which the whole system can be programmed. Any operating failures occurring with the locking system open permit access to the safety area while the fault is being cleared. The security system can be reprogrammed in this condition as an acute condition in which faulty operations are possible, but without preventing access to the security area.

The electronic management of the security closures, as disclosed hereinabove, affords numerous advantages.

After entry into the security zone and the closing of the door, followed by the bolting of the door, but not the lock, the code can be automatically scrambled. Thus, omitting to scramble the code is no longer possible, or has no negative consequences.

The setting of new codes, even periodic changes is highly simplified. A faulty code is merely eliminated by the new input. If a wrong code is inputted with a mechanical lock, the lock must be put into the neutral condition by a specialist to enable the new, correct code to be finally inputted.

The lock is automatically bolted. The automatic closure of the door can also be included in this operation.

Figure 5:
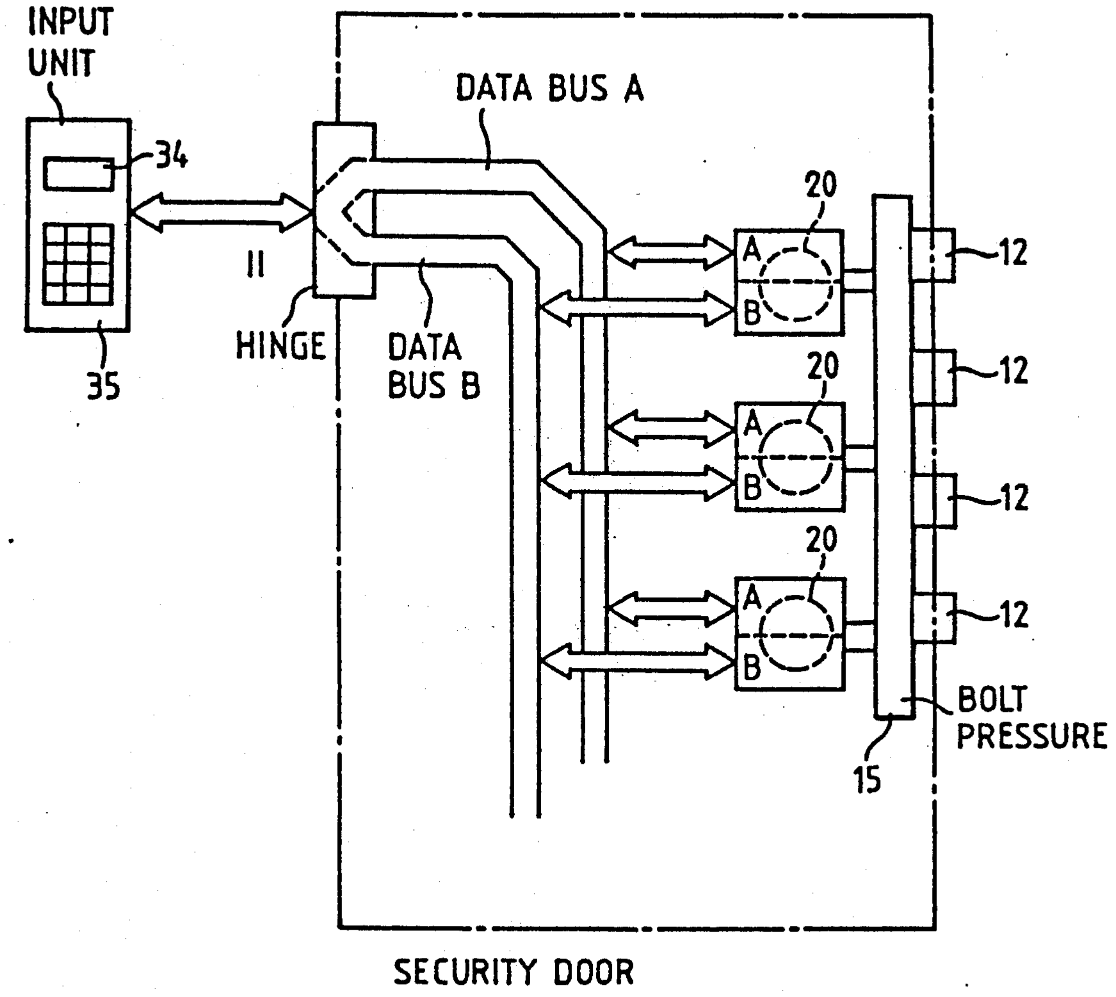
FIG. 5 is a block diagram of a lock system with standby redundancy.

For security, redundancy can be increased without difficulty at short notice through the use of a plurality of lock devices of the type shown, for example, in FIG. 4, connected in parallel to data buses A and B as illustrated in FIG. 5. The redundancy referred to is "active redundancy" wherein all redundant items, i.e., locks 20 work simultaneously. The redundancy concerns emergencies, where one or more locks fail and prevents a condition where the door neither can be opened or closed. Redundancy circuits per se are well known as defined on pages 748 and 749 of the IEEE Standard Dictionary of Electrical and Electronic Terms, Centennial Edition. For instance, each redundant lock device may respond to a different code or each may respond to multiple selected codes. This situation can be compared to techniques employed in aircraft design where several systems all work simultaneously and independently in response to codes or commands. Several codes can be used in cases where several persons alone or in combination have admission to a vault.

The locking system of the invention can employ a redundancy arrangement which provides two-out-of-three redundancy where voter modules operating on a fail-safe two-out-of-three principle are used for operation of final control elements with safety functions. This principle is known and is described, for example, in the article entitled "The AS2220 EHF Fault-Tolerant and Fail-Safe Automation Subsystem with Two-Out-Of-Three Redundancy" by Manfred Euringer and Warner Reichert, appearing in Siemens Power Engineering, VI (1984) No. 6,pp. 323-327. The central unit in this known system processes signals with a two-out-of-three redundancy as well as planned redundancy (one-out-of-two, two-out-of-two or two-out-of-three) at the process interface. The voter modules operate into a single channel I/O bus. The I/O bus voter modules in the extension units ensure that all I/O modules function correctly even in the event of failure of one set of central processing modules. The failure of one of these I/O bus voter modules can in the worst case adversely affect the functioning of the related I/O modules, but not the functioning of the I/O modules associated with the other I/O bus voter modules. This decoupling between the various extension units is utilized during planning of the system to upgrade the fault tolerance of the system or fulfill safety requirements. Binary signalling devices with safety functions are connected on the closed circuit principle to two channels in two different extension units. In the double redundancy safety circuits also described in the above-mentioned article, I/O level extension units which are connected to the I/O buses, control a valve or the like directly without use of a voter module so that the outputs of the I/O level extension units serve to operate a valve or the like directly for true redundant operation. This known principle of the redundancy safety circuits is used in the preferred embodiment illustrated in FIG. 5 where a plurality of locks 20, each configured as shown in FIG. 4, are connected in parallel to data buses A and B and each is independently capable of activating bolt beam 15 regardless of the operable condition of other ones of the locks 20 for true redundant operation.

Thus, FIG. 4 shows the lock circuit 20 together with its interconnection to hinge 11, through which interfacing to the input unit 35 is achieved, and its interfacing to lock bar 15 which is selectively locked and unlocked as a function of locking point 14.

The embodiment of FIG. 5 merely shows a plurality of locks 20 illustrated in FIG. 4, each of which is connected to the locking bolt 15 and through the hinge access to the input unit 35 as illustrated in FIG. 4. Each of the locking units 20 illustrated in FIG. 5 are connected in parallel through the hinge access via data buses A and B so that each I/O circuit therein interfaces therewith in precisely the same manner as illustrated in FIG. 4. Thus, other than each of the lock circuits 20 being connected in parallel in FIG. 5, there is no difference except that each locking unit is capable of independently locking and unlocking the locking bar 15. As noted above each locking unit may be responsive to different input codes or multiple codes.

Because the plurality of locking units 20 are connected in parallel and act independently in response to input codes on the locking bar 15, they have been referred to, in the conventional manner, as redundant locking means. The conventional form of redundancy is used herein, where effectively duplicate circuits are connected in parallel and act independently so that a failure in one does not cause a failure of the overall system. This is the type of active redundancy which has been employed within aircraft design.

The intelligence involved allows a number of variants without compelling any change in the locking system.

In the system of the present invention, it is confusing and difficult to put a locking point out of action in an armored door. The position of the lock is unknown and cannot be detected from outside features. The number of locks and locking points can be multiplied without any additional holes through the armoring and without additional connecting elements to the outside.

A locking point is always disposed between protective armoring layers with the lock. Thus, the lock and locking point can be completely masked and hidden without any exposed indication of its location.

The risk of a successful burglary is greatly reduced if a number of locks are provided. Additionally, their position cannot be determined from outside and can be different in each individual case.

While a particular embodiment has been chosen to illustrate the invention, it will be understood by those skilled in the art that various changes and modifications can be made therein without departing from the scope of the invention as defined in the appended claims.

What is claimed is:

1. A decentralized locking system for a security door having a bolt beam with bolts, comprising:

a plurality of locks mounted on an inner surface of the door, each lock being operatively connected to the bolt beam by a lock bar, each lock having a respective lock control means for separately and independently blocking or releasing the bolt beam, each lock being randomly distributed at a different location on the inner surface of the door;

lock operating means for receiving opening and closing codes from a user and controlling each of said plurality of locks in response thereto, having input means being spaced from said plurality of locks and located outside said door, said input means being electrically interconnected in parallel to the respective lock control means for supplying the opening and closing codes to each of said locks.

2. The system of claim 1, wherein several locks are mounted in selected positions on the interior surface of the door according to a specific individual choice.

3. The system of claim 2, wherein locks are mounted so that the selected positions cannot be identified from outside the door.

4. A locking system according to claim 1, wherein a plurality of locks and supply line means are electrically connected in parallel and are arranged for reciprocal use in redundant fashion, and wherein a redundant lock produces an alarm upon malfunction of another lock.

5. A locking system according to claim 1, wherein each of said plurality of lock control means contains electronic control elements with storage means for storing at least one lock code permutation and at least one time function.

6. A locking system according to claim 5, wherein said storage means is constructed to store several lock combination code permutations and multiple time functions.

7. A locking system according to claim 2, wherein each lock is automatically locked when the door is closed.

8. A locking system according to claim 5, wherein said electronic control elements comprise built-in actuating means for operating said lock and for transforming defined values into mechanical actions.

9. A locking system according to claim 8, wherein the actuating means is an A.C. motor.

10. The system according to claim 8, wherein the actuating means is a step motor.

11. A decentralized locking system for a security door having a bolt beam with bolts, comprising:

a plurality of locks mounted on an inner surface of the door, each lock being connected to the bolt beam by a lock bar, each lock having a respective lock control means with an associated locking point for separately and independently blocking or releasing the lock bar, each of the associated locking points being randomly distributed at a different location on the inner surface of the door, which cannot be identified from outside the door;

locking operating means for receiving opening and closing codes and controlling each of said plurality of locks in response thereto, having input means being spaced from said plurality of locks and located outside said door, said input means being electrically interconnected in parallel to the respective lock control means for supplying opening and closing codes to each of said locks, said input means being adapted for receiving user control commands for changing the opening and closing codes to each of said locks without access to the inside of the door, said input means being electrically interconnected in parallel through a first common data bus to the respective lock control means, and also being electrically interconnected in parallel through a second common data bus to the respective lock control means, and the first and second data buses being electrically connected in parallel.

* * * * *